United States Patent Office 3,557,572
Patented Jan. 26, 1971

3,557,572
HOMOKINETIC UNIVERSAL JOINT
Erich Aucktor and Walther Willimek, Offenbach am Main, Germany, assignors to Lohr & Bromkamp G.m.b.H., Offenbach am Main, Germany, a corporation of Germany
Filed Jan. 17, 1969, Ser. No. 792,022
Claims priority, application Austria, Jan. 18, 1968, A 510/68
Int. Cl. F16d 3/22, 3/34
U.S. Cl. 64—8                                    11 Claims

ABSTRACT OF THE DISCLOSURE

A ball cage retains a plurality of balls between an inner joint member and an outer joint member. Grooves formed in the outer surface of the inner joint member, in which the balls are seated, have center lines which extend with the radial distance of each of the center lines which from the axis of the inner joint member greatest at the ends and decreasing toward the center of the center line. The centers of the spherical inner and outer surfaces of the ball cage are on the axis of the ball cage equidistant from and on opposite sides of a plane through the centers of the balls or coincident in said plane. In the latter case said grooves have to be disposed in helices of the same and opposite pitch in the inner and outer joint members. This arrangement of the grooves is also possible in the first mentioned case.

DESCRIPTION OF THE INVENTION

The present invention relates to a homokinetic universal or constant velocity joint. More particularly, the invention relates to a homokinetic universal joint hereinafter referred to as a synchromesh swivel joint.

The homokinetic universal joint or synchromesh swivel joint of the present invention is of a type which utilizes torque transmission between an inner joint member and an outer joint member by a plurality of balls. The balls cooperate with cooperating pairs of corresponding grooves formed in the outer surface of the inner joint member and in the inner surface of the outer joint member. The balls are retained by a ball cage in a plane perpendicular to the axis of said ball cage. The ball cage has a hollow spherical inner surface and a spherical outer surface and is disposed between and guided by the outer surface of the inner joint member and the inner surface of the outer joint member. In synchromesh swivel joints of this type the balls are controlled into a plane which contains the angle bisector between the axes of the inner and outer joint members and positioned perpendicular to said axes. The invention is applicable to synchromesh swivel joints of known types in which the control is realized by the centers of the spherical inner surface and the spherical outer surface of the ball cage being positioned on the axis of the ball cage on opposite sides of and equidistant from a plane through the centers of the balls and/or by the center lines of the grooves being positioned on helices of the same, but opposite, pitch in the inner and outer joint members.

The balls must rotate freely in the windows of the ball cage in order to transmit the torque in a desired and efficient manner. The required play of the balls in the windows of the ball cage in direction of the axis of said ball cage presents difficulties, however, in an inclined swivel joint. If the cooperating grooves open in the configuration of a taper in one direction, the balls move back in the ball cage windows within the allotted clearance in the direction of opening of the taper. The balls are then no longer active in transmitting the torque between the inner and outer joint members. Thus, in synchromesh swivel joints of known type, the number of balls which participate in the transmission of the torque between the inner and outer joint members decreases with an increase in the angle of deflection of the swivel joint. The efficiency and effectiveness of torque transmission of such swivel joints is thus considerably reduced.

The principal object of the present invention is to provide a new and improved synchromesh swivel joint.

An object of the present invention is to provide a synchromesh swivel joint of simple structure.

An object of the present invention is to provide a synchromesh swivel joint which transmits a maximum torque.

An object of the present invention is to provide a synchromesh swivel joint which transmits a maximum torque for a minimum cost of manufacture with efficiency, effectiveness and reliability.

An object of the present invention is to provide a synchromesh swivel joint which provides a smooth torque transmission with efficiency, effectiveness and reliability.

In accordance with the present invention, a synchromesh swivel joint comprises an outer joint member having an inner surface. An inner joint member has an axis and a spherical outer surface. Torque transmitting apparatus comprises grooves formed in the outer surface of the inner joint member. Cooperating grooves are formed in the inner surface of the outer joint member. Each of the grooves formed in the outer surface of the inner joint member has a center line. Each of a plurality of balls is seated in a corresponding cooperating pair of the grooves. A ball cage retains the balls. The ball cage has an axis, a hollow spherical inner surface and a spherical outer surface and is disposed between and guided by the outer surface of the inner joint member and the inner surface of the outer joint member. The centers of the inner and outer surfaces of the ball cage are on the axis of the ball cage equidistant from and on opposite sides of a plane through the centers of the balls. The center lines of the grooves formed in the inner joint member extend with the radial distance of each of the center lines from the axis of the inner joint member greatest at the ends of the center line and decreasing toward the center of the center line.

The inner surface of the outer joint member may be of cylindrical configuration when the inner joint member is displaceable relative to the outer joint member. The inner surface of the outer joint member may be of spherical configuration when the inner joint member is fixed relative to the outer joint member. The center lines of the grooves may be disposed in helices of the same pitch but opposite directions in the inner and outer joint members.

The center line of each of the grooves formed in the inner joint member may be a circular arc having a center point lying in a plane normal to the axis of the inner joint member and extending through the center point of the inner joint member. Thus, in accordance with the present invention, the cross-section of the grooves formed in the inner and outer joint members tapers down from the center point of the swivel joint toward both ends of said swivel joint. The selection of a proper increase in the downward tapering or constriction of the grooves permits all the freely rotatable balls to participate uniformly in the transmission of torque between the inner and outer joint members, despite an inclined or deflected swivel joint and despite the play of the balls in the ball windows of the ball cage. The swiven joint of the present invention thus provides almost perfect transmission of torque.

In accordance with the invention, a homokinetic universal joint comprises an outer joint member having an inner surface. An inner joint member has an axis and a spherical outer surface. Torque transmitting means comprises gooves formed in the outer surface of the inner joint member. Cooperating grooves are formed in the inner surface of the outer joint member. Each of the grooves formed of the inner joint member has a center line. Each of a plurality of balls is seated in a corresponding cooperating pair of the grooves and a ball cage retaining the balls. The ball cage has an axis, a hollow spherical inner surface and a spherical outer surface and is disposed between and guided by the outer surface of the inner joint member and the inner surface of the outer joint member. The centers of the inner and outer surfaces of the ball cage are on the axis of the ball cage coincident in a plane through the centers of the balls. The grooves are disposed in helices of the same pitch but opposite directions in the inner and outer joint members and are formed in the inner joint member extending with the radial distance of each of the center lines from the axis of the inner joint member greatest at the ends of the center line and decreasing toward the center of the center line.

The inner surface of the outer joint member may be of cylindrical configuration with the inner joint member being displaceable relative to the outer joint member. The inner surface of the outer joint member may be of spherical configuration with the inner joint member being fixed relative to the outer joint member.

The central line of each of the grooves formed in the inner joint member may be a circular arc. The center line of each groove formed in the inner joint member may be a circular arc having a center point lying in a plane normal to the axis of the inner joint member of extending through the center point of the inner joint member.

In order that the present invention may be readily carried into effect, it will now be described with reference to the accompanying drawings, wherein.

Figure 1:
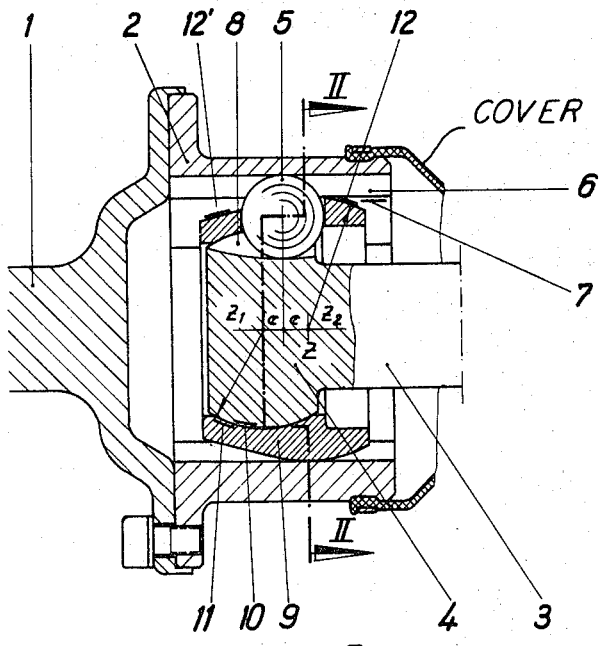
FIG. 1 is a longitudinal section of an embodiment of the synchromesh swivel joint of the present invention, in which the inner joint member is displaceable relative to the outer joint member, FIG. 1 being a view taken along the lines I—I of FIG. 2.
Figure 3:
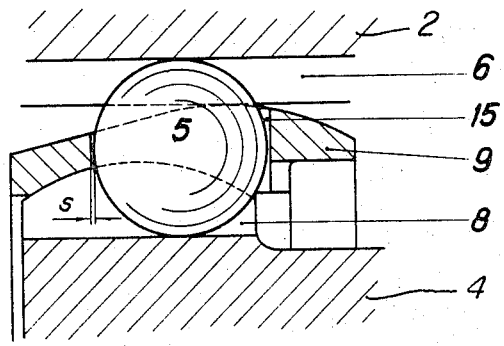
Figure 4:
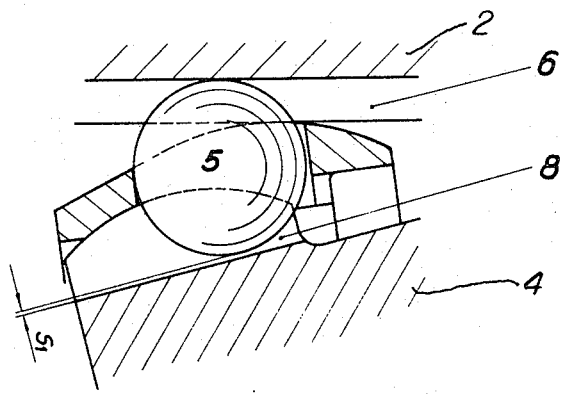
Figure 5:
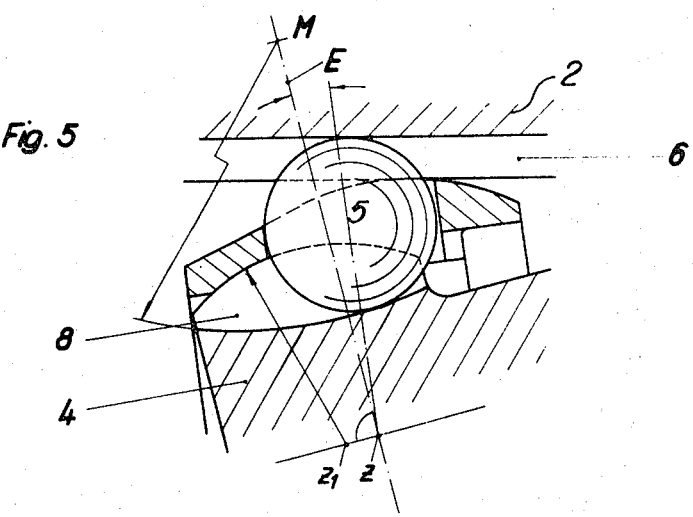
Figure 6:
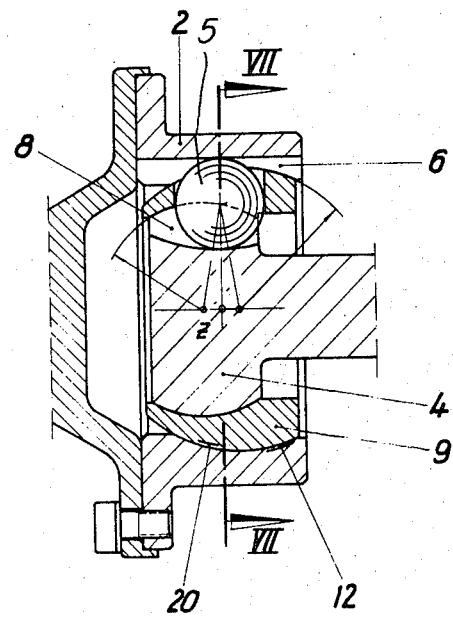
Figure 7:
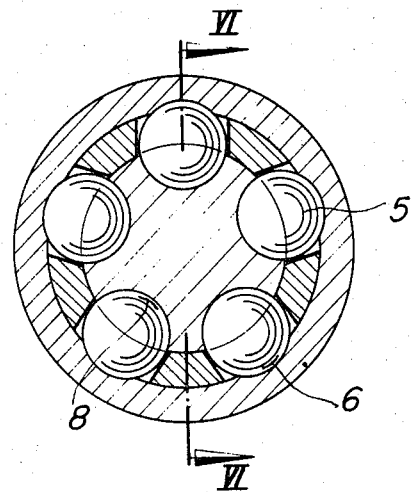
Figure 8:
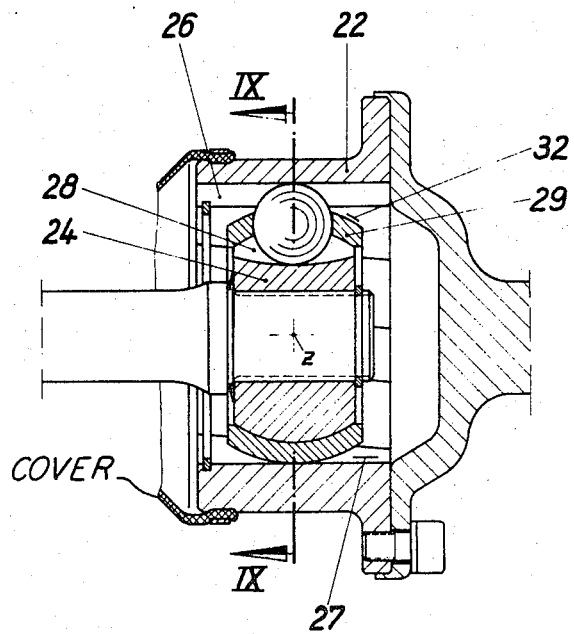
Figure 9:
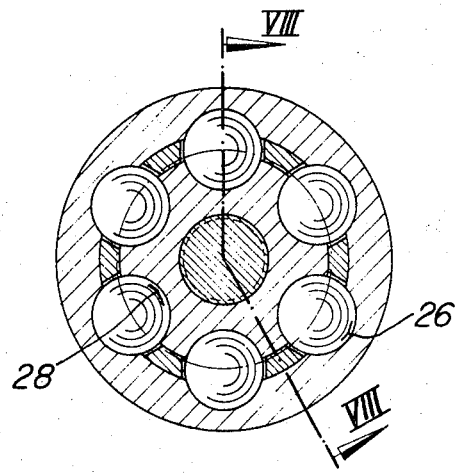
Figure 10:
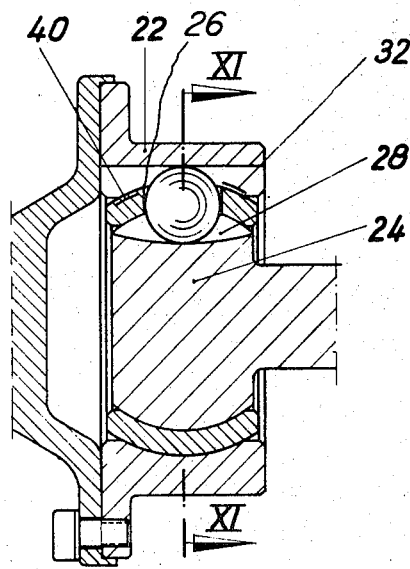
Figure 11:
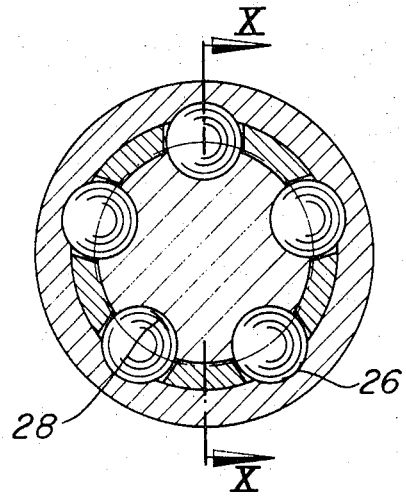

FIGS. 3, 4 and 5 each illustrate the operation of the invention, FIGS. 3 and 4 being an enlarged section of part of FIG. 1 through a known swivel joint in elongated and inclined condition and FIG. 5 being an enlarged section of a swivel joint of the present invention in inclined condition;

FIG. 6 is a longitudinal section of another embodiment, similar to that of FIG. 1, of the synchromesh swivel joint of the present invention, in which the inner joint member is fixed relative to the outer joint member, FIG. 6 being a view taken along the lines VI—VI of FIG. 7;

FIG. 7 is a view taken along the lines VII—VII of FIG. 6;

FIG. 8 is a longitudinal section of another embodiment of the synchromesh swivel joint of the present invention, in which the inner joint member is displaceable relative to the outer joint member, FIG. 8 being a view taken along the lines VIII—VIII of FIG. 9;

FIG. 9 is a view taken along the lines IX—IX of FIG. 8;

FIG. 10 is a longitudinal section of another embodiment, similar to that of FIG. 8, of the synchromesh swivel joint of the present invention, in which the inner joint member is fixed relative to the outer joint member, FIG. 10 being a view taken along the lines X—X of FIG. 11; and FIG. 11 is a sectional view taken along the lines XI—XI of FIG. 10.

In the figures the same components are identified by the same reference numerals.

In FIG. 1, the synchromesh swivel joint comprises an outer joint member 2 affixed to a shaft 1 via flanges. An inner joint member 4 comprises a single integral unit with a shaft 3. Torque is transmitted between the inner joint member 4 and the outer joint member 2 via a plurality of balls 5.

The balls 5 are seated in or cooperate with a plurality of grooves 6 formed in the cylindrical inner surface 7 of the outer joint member 2 and cooperating corresponding grooves 8 formed in the spherical outer surface 11 of the inner joint member 4. There are, thus, five grooves 6 formed in the inner surface 7 of the outer joint member 2 and five cooperating corresponding grooves 8 formed in the outer surface of the inner joint member 4, since there are five balls 5. The grooves 6 are parallel to the axis of the outer joint member 2 and the grooves 8 are parallel to the axis of the inner joint member 4.

The balls 5 are retained by a ball cage 9 having an axis, a hollow spherical inner surface 10 and a spherical outer surface 12, 12'. The ball cage 9 is disposed between and guided by the outer surface 11 of the inner joint member 4 and the inner surface 7 of the outer joint member 2. The hollow spherical inner surface 10 of the ball cage 9 has a center $Z_1$ which is on the axis of said ball cage. The spherical outer surface 12, 12' of the ball cage 9 has a center $Z_2$ which is on the axis of said ball cage. The centers $Z_1$ and $Z_2$ are positioned on opposite sides of the center Z of the swivel joint and equidistant therefrom at a distance $e$. The center Z of the swivel joint is determined by the point of intersection of the plane through the center points of the balls 5, or the windows of the ball cage 9 which accommodate said balls, and the axis of said ball cage.

Figure 2:
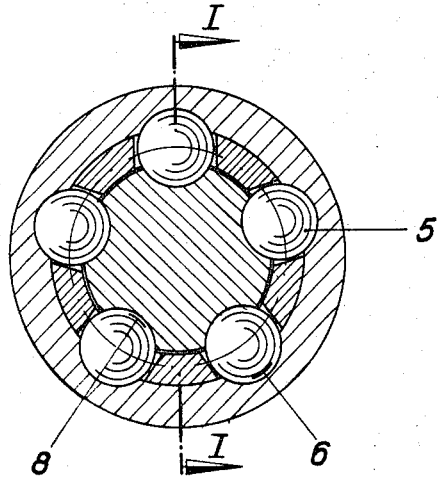
FIG. 2 is a sectional view taken along the lines II—II of FIG. 1.

The spherical outer surface 12 of the ball cage 9 is elongated to the left by the conical outer surface 12' thereof. The spherical outer surface 12 and the conical outer surface 12' are tangentially joined and the cone angle of said conical outer surface 12' corresponds to the greatest angle of deflection of the swivel joint. Thus, the conical outer surface 12' of the ball cage 9 bears against the cylindrical inner surface 7 of the outer joint member 2 only when the greatest angle of deflection occurs. The swivel joint of the embodiment of FIGS. 1 and 2 is a displaceable joint, since during torque transmission the inner joint member 4 is displaceable with the ball cage 9 and the balls 5 relative to the outer joint member 2.

FIGS. 3 and 4 illustrate the cooperation of a ball 5 with a groove 6 formed in the inner surface of the outer joint member and with the corresponding cooperating groove 8 formed in the outer surface of the inner joint member, in a swivel joint of known type in elongated and in inclined condition. The ball 5 is freely rotatable in the ball window 15 thereof formed in the ball cage 9. There is a clearance, tolerance, allowance or play $2s$ in the ball window 15 between the diameter of the ball in said window and the dimensions of said window parallel to the axis of the ball cage 9.

When the swivel joint is in the inclined position, as shown in FIG. 4, a cooperating corresponding pair of grooves 6 and 8 for a ball 5 alternately open in the outer and inner joint members, in a taper toward one or the other side. The taper urges each ball 5 in the opening direction of the taper. The opening direction of the taper in FIG. 4 is to the left. The ball 5 in each ball window 15 is urged in the direction of the opening of the taper until it abuts the wall of said ball window. This provides a clearance, tolerance or play $s_1$ of the ball 5 in the groove 8, as shown in FIG. 4, or in the groove 6, or in both. The tolerance $s_1$ indicates that the ball 5 no longer abuts against the opposite facing surfaces of the grooves 6 and 8 and therefore is no longer active in the transmission of torque between the inner and outer joint members 4 and 2 (FIG. 1).

In accordance with the present invention, in order to provide torque transmission of maximum efficiency, the center line of each of the grooves 8 formed in the outer surface of the inner joint member 4 is a circular arc. The circular arc in which each of the grooves 8 is formed has a center point M which circular arc lies in a plane E normal to the axis of the inner joint member 4 and extending through the center point Z of said inner joint member. In FIG. 5, only the base, and not the center line, of the groove 8 is illustrated.

The grooves 8 are formed in the outer surface 11 of the inner joint member 4 in a manner whereby the center lines, and also the base lines, of said grooves extend with the radial distance of each of said center lines from the axis of said inner joint member greatest at the ends of said center line and decreasing toward the center of said center line. That is, the radial distance between the center line of each groove 8 and the axis of the inner joint member 4 is a minimum at the center Z of said center line and said axis and increases toward the ends of said center line and said axis. Suitable selection of the radius of curvature of the center line of each of the grooves 8 ensures that in a swivel joint in inclined condition, when the ball 5 moves away from the center point of the ball cage window 15 toward a side of said ball cage, said ball remains in abutment or contact with the surfaces in which each pair of corresponding cooperating grooves 6 and 8 are formed. This ensures abutment of each ball 5 with both the inner and outer joint members 4 and 2 and provides maximum transmission of torque between said inner and outer joint members. The maximum efficiency of torque transmission results from each of the balls 5 being in constant abutment with both the inner and outer joint members and thereby constantly transmitting torque at its maximum efficiency.

The desired grooves 8 having the desired center lines may be provided in the simplest manner by millers, cutters or grinders having suitable milling, cutting, or grinding edges or heads, having suitable cross-sectional areas corresponding to the cross-sections of the grooves. A suitable pilot cam may be utilized in high power grinders, particularly when the center line is not in a circular arc, but is in a line which deviates from a circular arc and which is calculated precisely according to the play of the balls in the ball cage windows.

The embodiment of the swivel joint of FIGS. 6 and 7 differs from the swivel joint of FIGS. 1 and 2 only because the outer joint member 2 has a hollow spherical inner surface 20 in the embodiment of FIG. 6 rather than a cylindrical inner surface, as in the embodiment of FIG. 1. Furthermore, the entire outer surface of the ball cage 9 is a spherical outer surface 12 and is not elongated by a conical surface 12', as in FIG. 1.

Due to the differences in the embodiments of FIGS. 1 and 6, although the embodiment of FIG. 6 is similar to that of FIG. 1, the inner joint member 4 of the embodiment of FIG. 6 is fixed relative to the outer joint member 2 of said embodiment, whereas the inner joint member 4 of the embodiment of FIG. 1 is displaceable relative to the outer joint member 2 of the embodiment of FIG. 1. Thus, in the embodiment of FIG. 6, the inner joint member 4 can only swivel about the center point of the outer joint member 2 and cannot be otherwise displaced relative to said outer joint member. In the embodiment of FIG. 6, each of the balls 5 is in constant contact or abutment with both the inner and the outer joint members, so that all the balls transmit the torque and the torque transmission is at maximum efficiency.

FIGS. 8 and 9 illustrative another embodiment of the swivel joint of the present invention. In the embodiment of FIG. 8, the inner joint member 24 is displaceable relative to the outer region member 22. A plurality of grooves 26 are formed in the inner surface of the outer joint member 22 and a plurality of grooves 28 are formed in the outer surface of the inner joint member 24. The grooves 26 formed in the outer joint member 22 are positioned or disposed on a left-handed helix and the grooves 28 formed in the outer surface of the inner joint member 24 are positioned or disposed along right-handed helices. The pitches of the helices are the same, although they are opposite.

In FIG. 8, the grooves are illustrated as being twisted in the plane of the drawing. The ball cage 29 has a hollow spherical inner surface and a spherical outer surface 32 and is disposed between and guided by the outer surface of the inner joint member and the cylindrical inner surface 27 of the outer joint member 22. The spherical outer surface of the inner joint member 24 and the spherical surfaces of the ball cage 29 are in concentric relation with the center point Z of the swivel joint of FIGS. 8 and 9.

As described with relation to FIG. 5, the center line of each of the grooves 28, which are positioned in a helix, increases in its radial distance from the axis of the inner joint member 24 from the center point Z of the swivel joint as it moves toward each of its ends or as it moves toward each of the ends of said inner joint member. This is illustrated in FIG. 8, wherein the groove 28, illustrated as twisted into the plane of the drawing, extends along a helix.

The embodiment of FIGS. 10 and 11 is similar to that of FIGS. 8 and 9, with the exception that in FIGS. 10 and 11, the inner joint member 24 is fixed relative to the outer joint member 22. This is due to the fact that the outer joint member 22 has a hollow spherical inner surface 40. In the embodiment of FIGS. 10 and 11, each of the grooves 28 formed in the outer surface of the inner joint member 24 has a center line which increases in radial distance from the axis of the swivel joint as it moves from its center to its ends, or as said axis moves from the center point of the swivel joint toward its ends.

While the invention has been described by means of specific examples and in specific embodiments, we do not wish to be limited thereto, for obvious modifications will occur to those skilled in the art without departing from the spirit and scope of the invention.

We claim:

1. A homokinetic universal joint comprising
    an outer joint member having an inner surface;
    an inner joint member having an axis and a spherical outer surface; and
    torque transmitting means comprising grooves formed in the outer surface of said inner joint member, cooperating grooves formed in the inner surface of said outer joint member, each of said grooves formed in the outer surface of said inner joint member having a center line, a plurality of balls each seated in a corresponding cooperating pair of said grooves and a ball cage retaining said balls, said ball cage having an axis, a hollow spherical inner surface and a spherical outer surface and being disposed between and guided by the outer surface of said inner joint member and the inner surface of said outer joint member, the centers of the inner and outer surfaces of said ball cage being on the axis of said ball cage equidistant from and on opposite sides of a plane through the centers of said balls, the center lines of the grooves formed in said inner joint member extending with the radial distance of each of said center lines from the axis of said inner joint member greatest at the ends of said center line and decreasing toward the center of said center line.

2. A homokinetic universal joint as claimed in claim 1, wherein the inner surface of said outer joint member is of cylindrical configuration and said inner joint member is displaceable relative to said outer joint member.

3. A homokinetic universal joint as claimed in claim 1, wherein the inner surface of said outer joint member is of spherical configuration and said inner joint member is fixed relative to said outer joint member.

4. A homokinetic universal joint as claimed in claim 1, wherein the center lines of said grooves are disposed in helices of the same pitch but opposite directions in the inner and outer joint members.

5. A homokinetic universal joint as claimed in claim 1, wherein the center line of each of the grooves formed in said inner joint member is a circular arc.

6. A homokinetic universal joint as claimed in claim 1, wherein the center line of each groove formed in said inner joint member is a circular arc having a center point lying in the plane normal to the axis of said inner joint member and extending through the center point of said inner joint member.

7. A homokinetic universal joint comprising
an outer joint member having an inner surface;
an inner joint member having an axis and a spherical outer surface; and
torque transmitting means comprising grooves formed in the outer surface of said inner joint member, cooperating grooves formed in the inner surface of said outer joint member, each of said grooves formed in the outer surface of said inner joint member having a center line, a plurality of balls each seated in a corresponding cooperating pair of said grooves and a ball cage retaining said balls, said ball cage having an axis, a hollow spherical inner surface and a spherical outer surface and being disposed between and guided by the outer surface of said inner joint member and the inner surface of said outer joint member, the centers of the inner and outer surfaces of said ball cage being on the axis of said ball cage coincident in a plane through the centers of said balls, said grooves being disposed in helices of the same pitch but opposite directions in the inner and outer joint members and being formed in said inner joint member extending with the radial distance of each of said center lines from the axis of said inner joint member greatest at the ends of said center line and decreasing toward the center of said center line.

8. A homokinetic universal joint as claimed in claim 7, wherein the inner surface of said outer joint member is of cylindrical configuration and said inner joint member is displaceable relative to said outer joint member.

9. A homokinetic universal joint as claimed in claim 7, wherein the inner surface of said outer joint member is of spherical configuration and said inner joint member is fixed relative to said outer joint member.

10. A homokinetic universal joint as claimed in claim 7, wherein the center line of each of the grooves formed in said inner joint member is a circular arc.

11. A homokinetic universal joint as claimed in claim 7, wherein the center line of each groove formed in said inner joint member is a circular arc having a center point lying in a plane normal to the axis of said inner joint member and extending through the center point of said inner joint member.

References Cited

UNITED STATES PATENTS

| | | | |
|---|---|---|---|
| 1,975,758 | 10/1934 | Stuber | 64—21 |
| 3,218,827 | 11/1965 | Aucktor | 64—8 |
| 3,442,095 | 5/1969 | Devos | 64—21 |

JAMES A. WONG, Primary Examiner

U.S. Cl. X.R.

64—21